US011580355B2

(12) United States Patent
Niggemeyer et al.

(10) Patent No.: US 11,580,355 B2
(45) Date of Patent: Feb. 14, 2023

(54) SYSTEM-ON-A-CHIP INCORPORATING ARTIFICIAL NEURAL NETWORK AND GENERAL-PURPOSE PROCESSOR CIRCUITRY

(71) Applicant: Electronic Warfare Associates, Inc., Herndon, VA (US)

(72) Inventors: Dirk Niggemeyer, Shrewsbury, MA (US); Lester A. Foster, Frederick, MD (US); Elizabeth M. Rudnick, Shrewsbury, MA (US)

(73) Assignee: Electronic Warfare Associates, Inc., Herndon, VA (US)

( * ) Notice: Subject to any disclaimer, the term of this patent is extended or adjusted under 35 U.S.C. 154(b) by 627 days.

(21) Appl. No.: 16/592,222

(22) Filed: Oct. 3, 2019

(65) Prior Publication Data
US 2020/0134416 A1  Apr. 30, 2020

Related U.S. Application Data

(60) Provisional application No. 62/750,584, filed on Oct. 25, 2018.

(51) Int. Cl.
| | |
|---|---|
| *G06K 9/62* | (2022.01) |
| *G06N 3/04* | (2023.01) |
| *G06N 3/063* | (2023.01) |
| *G06N 3/08* | (2023.01) |
| *G10L 15/16* | (2006.01) |
| *G10L 15/02* | (2006.01) |
| *G10L 25/51* | (2013.01) |
| *G06V 10/94* | (2022.01) |

(52) U.S. Cl.
CPC ............. *G06N 3/04* (2013.01); *G06K 9/6201* (2013.01); *G06K 9/628* (2013.01); *G06N 3/0635* (2013.01); *G06N 3/08* (2013.01); *G06V 10/95* (2022.01); *G10L 15/02* (2013.01); *G10L 15/16* (2013.01); *G10L 25/51* (2013.01); *G10L 2015/025* (2013.01)

(58) Field of Classification Search
CPC ............ G06N 3/04; G06N 3/06; G06N 3/063; G06N 3/0635; G06K 9/6201; G06K 9/6267; G06K 9/6279; G06K 9/628; G06V 10/764; G06V 10/82; G06F 1/32; G06F 1/3203; G06F 1/3206; G10L 15/08; G10L 15/16; Y02D 10/00
See application file for complete search history.

(56) References Cited

U.S. PATENT DOCUMENTS

| | | | |
|---|---|---|---|
| 7,487,006 B2 * | 2/2009 | Kamiya et al. ..... | G05B 19/4093 700/192 |
| 10,559,200 B1 * | 2/2020 | Langley et al. ........ | G06V 20/63 |
| 2005/0206555 A1 * | 9/2005 | Bridgelall et al. ...... | G01S 13/74 340/8.1 |
| 2016/0328642 A1 * | 11/2016 | Himebaugh et al. ........ | G06N 3/0635 |
| 2017/0041540 A1 * | 2/2017 | Foster et al. ........... | G06V 20/52 |
| 2018/0070253 A1 * | 3/2018 | Kleinbeck et al. ... | H04W 16/14 |

FOREIGN PATENT DOCUMENTS

| | | | | |
|---|---|---|---|---|
| CN | 105229724 A | * | 1/2016 | ........... G06F 1/3203 |
| CN | 1105591469 A | | 5/2016 | |
| CN | 108474841 A | | 8/2018 | |
| WO | WO-2012/155105 A1 | * | 11/2012 | ........... G06F 1/3231 |
| WO | WO-2017/105517 A1 | * | 6/2017 | ........... G06F 1/3206 |

OTHER PUBLICATIONS

Foster et al. "Biologically-Inspired Processor for Ultra-Low Power Audio and Vido Suveillance Application" National Defense Industry Association (NDIA) Army Science and Technology Conference, Aug. 30, 2018.
Taiwan Office Action in Application No. 108137591, dated Dec. 30, 2022.

* cited by examiner

*Primary Examiner* — Andrew W Johns
(74) *Attorney, Agent, or Firm* — DLA Piper LLP US

(57) ABSTRACT

A circuit system and a method of analyzing audio or video input data that is capable of detecting, classifying, and post-processing patterns in an input data stream. The circuit system may consist of one or more digital processors, one or more configurable spiking neural network circuits, and digital logic for the selection of two-dimensional input data. The system may use the neural network circuits for detecting and classifying patterns and one or more the digital processors to perform further detailed analyses on the input data and for signaling the result of an analysis to outputs of the system.

23 Claims, 14 Drawing Sheets

SYSTEM-ON-A-CHIP INCORPORATING ARTIFICIAL NEURAL NETWORK AND GENERAL-PURPOSE PROCESSOR CIRCUITRY

CROSS-REFERENCE TO RELATED APPLICATIONS

This application is based on and derives the benefit of the filing date of U.S. Patent Application No. 62/750,584, filed Oct. 25, 2018. The entire content of this application is herein incorporated by reference in its entirety.

STATEMENT OF GOVERNMENT INTEREST

This invention was made with Government support under Contract No. W15QKN-14-C-20140904 awarded by the U.S. Government as represented by the Secretary of the Army. The Government has certain rights in the invention.

FIELD

The embodiments disclosed herein relate generally to the technical field of electronic circuits. More particularly, the disclosed embodiments relate to systems of electronic circuits that are capable of detecting and classifying certain patterns in input signals, such as digital video, radio frequency and audio signals.

BACKGROUND

As is known in the art, audio, radio frequency intercept systems and video surveillance systems have to efficiently process large amounts of data during periods of high input activity; the same systems need to operate using very low amounts of power during periods when the input data does not change or only rarely changes. An energy-efficient implementation of such a system should be capable of detecting the level of activity at its inputs and properly adjust its compute capabilities to the level of activity to operate while consuming low amounts of energy.

There is an interest in performing energy-efficient pattern matching processing of two-dimensional data. Examples include pattern matching of static imagery and one-dimensional data over many time intervals. Examples of one-dimensional data include radio frequency spectrum analyzer waterfall plots where each line represents the output magnitude of a set of bandpass filters contiguously spaced over a larger spectrum as a function of time. In the audio spectrum, the data can be the output magnitude of contiguously spaced bandpass filters over time.

For image detection and image classification tasks, e.g., distinguishing between soldiers, civilians, animals, etc., on images, the images are loaded into a computer system either as individual images or as video streams, which consist of multiple images that are read in sequence. The images are often encoded as a rectangular block of pixels. As an example, in RGB images, each pixel consists of 8 bits of "red" data, 8 bits of "green" data, and 8 bits of "blue" data. The combination of the three color values results in the final color and brightness of a pixel.

Radio Spectrum data over time may provide a spectral fingerprint that may identify the type of emitters in an environment. Audio fingerprints may identify acoustic phenomena of interest, and, speakers or spoken phenomes to perform speech to text type applications.

In software-based pattern matching classification systems, algorithms are executed on either general-purpose processor (CPU) cores or specialized programmable hardware that supports typical pattern matching operations, such as convolutions.

All of these systems suffer from one major drawback: The power consumption of the systems is high, due to the fact that the processors need to be constantly operating, no matter whether the input stream of images or spectral content over time has any content of interest, such as soldiers or people in general, in it. For example, when pointing a camera at a rear entrance of a building during the night: There might be a small number of people seen on the video stream over the course of the night, totaling a minute or two of image streams worth analyzing, while the system needs to be operating throughout the entire night, e.g., eight hours. Being able to turn the system on only when needed, compared to continuous operation, could save (1−(2 min)/(8 hours))*100%=99.58% of energy.

SUMMARY

Disclosed herein is a circuit system and a method of analyzing audio or video input data that is capable of detecting, classifying, and post-processing patterns in an input data stream. The circuit system may consist of one or more digital processors, one or more configurable spiking neural network circuits, and digital logic for the selection of two-dimensional input data. The system may use the neural network circuits for detecting and classifying patterns and one or more the digital processors to perform further detailed analyses on the input data and for signaling the result of an analysis to outputs of the system.

DETAILED DESCRIPTION OF THE INVENTION

Figure 1:
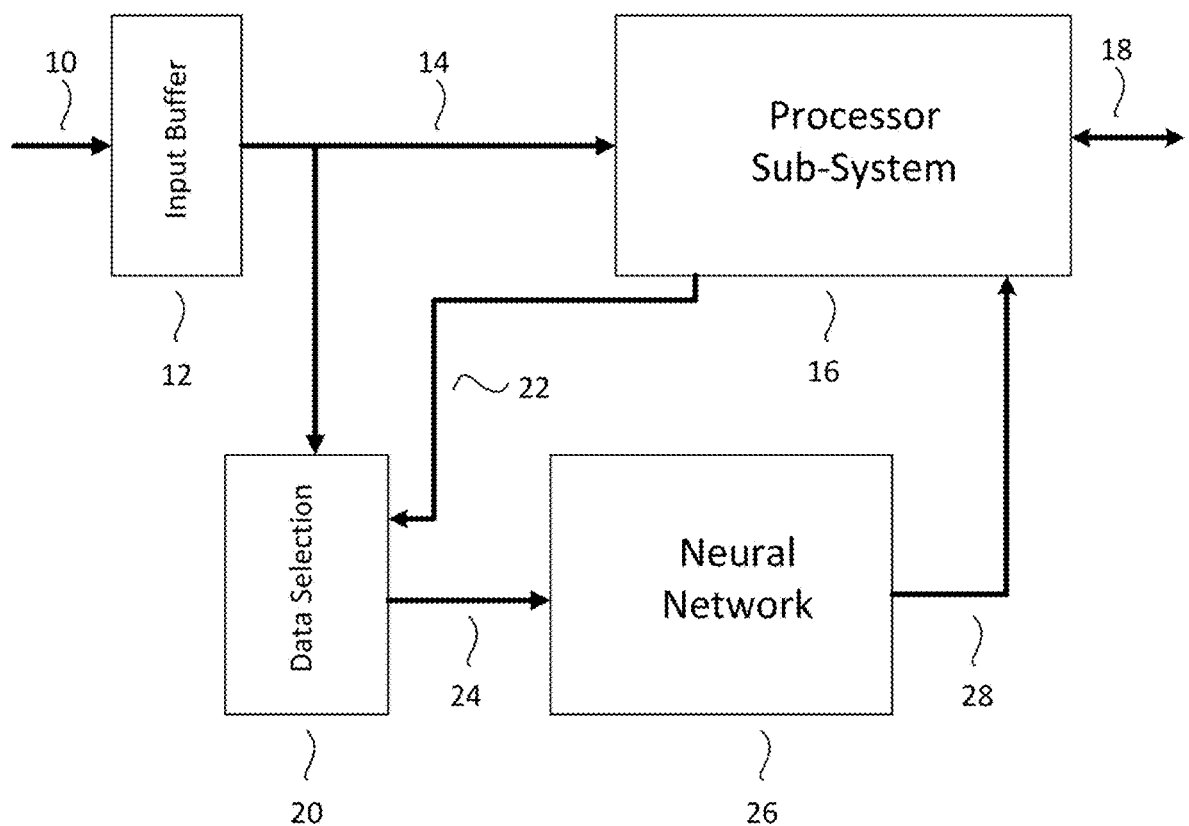
FIG. 1 is a high-level block diagram of an example embodiment disclosed herein.

Referring now to FIG. 1 there is shown a primary input signal bus 10, an input buffer block 12, a processor sub-system 16, a bidirectional bus 18, connected to the processor sub-system 16 and the primary outputs of the embodiment, a data selection block 20, and a neural network block 26.

In more detail, still referring to FIG. 1, the input buffer 12 may be used to buffer a continuous or non-continuous stream of input data on bus 10 and may allow processor sub-system 16 and data selection block 20 to consume this data at a rate different from the data rate on input bus 10. The outputs of input buffer 12 are connected through bus 14 to the processor sub-system 16 and the inputs of the data selection block 20; the output bus 24 of data selection block 20 is connected to the neural network block 26, and the outputs of neural network block 26 are connected to the processor sub-system through bus 28.

Still referring to FIG. 1, the processor sub-system 16 may also send control signals through bus 22 to the data selection block 20.

Figure 2:
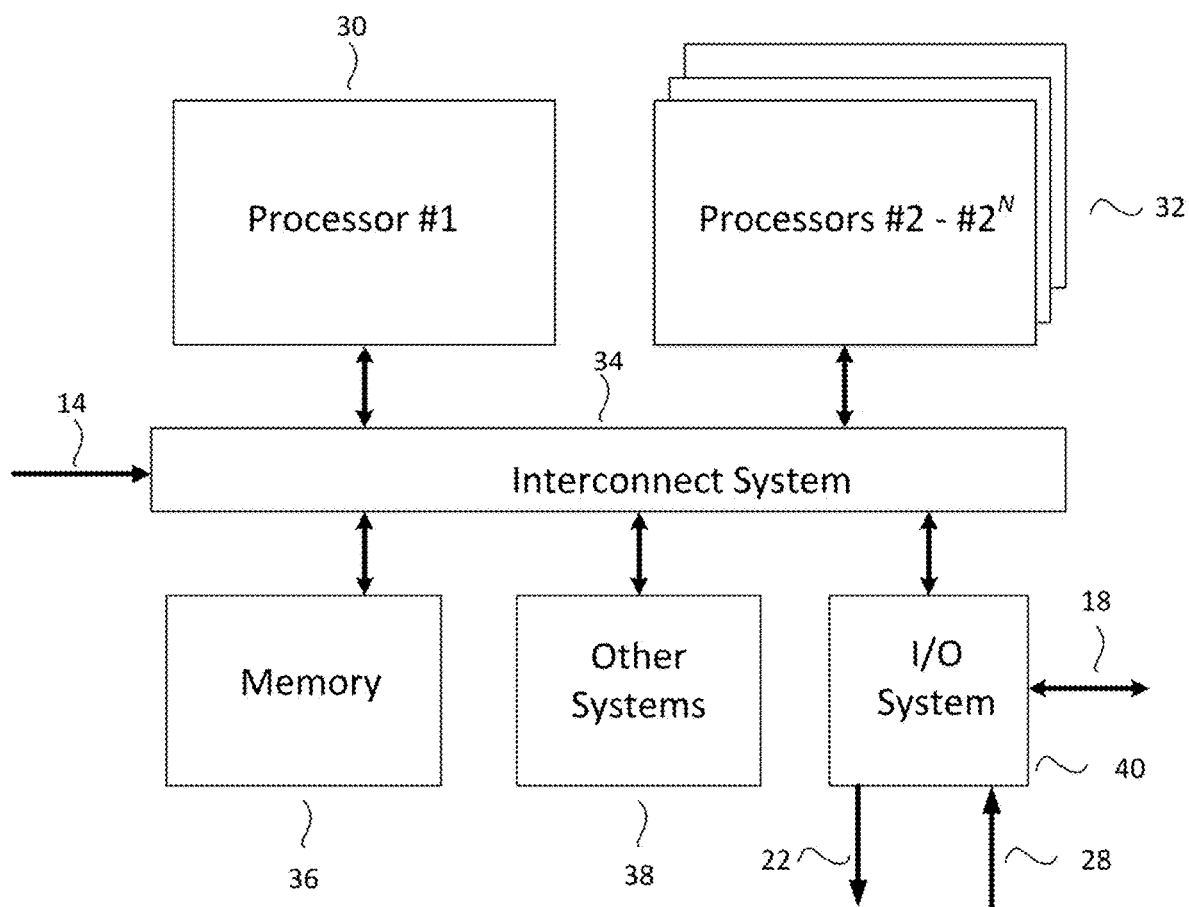
FIG. 2 is a diagram of an example processor sub-system from FIG. 1.

FIG. 2, illustrates an example of the processor sub-system 16 of FIG. 1. This processor sub-system may consist of an interconnect system 34, connecting processor 30 and one or more optional additional processors 32 with memory block 36, other system components 38, and I/O system block 40.

Still referring to FIG. 2, communication with other components of FIG. 1 may be performed through input bus 14, which is connected to interconnect system 34, and bus signals 18, 22, and 28.

Figure 3:
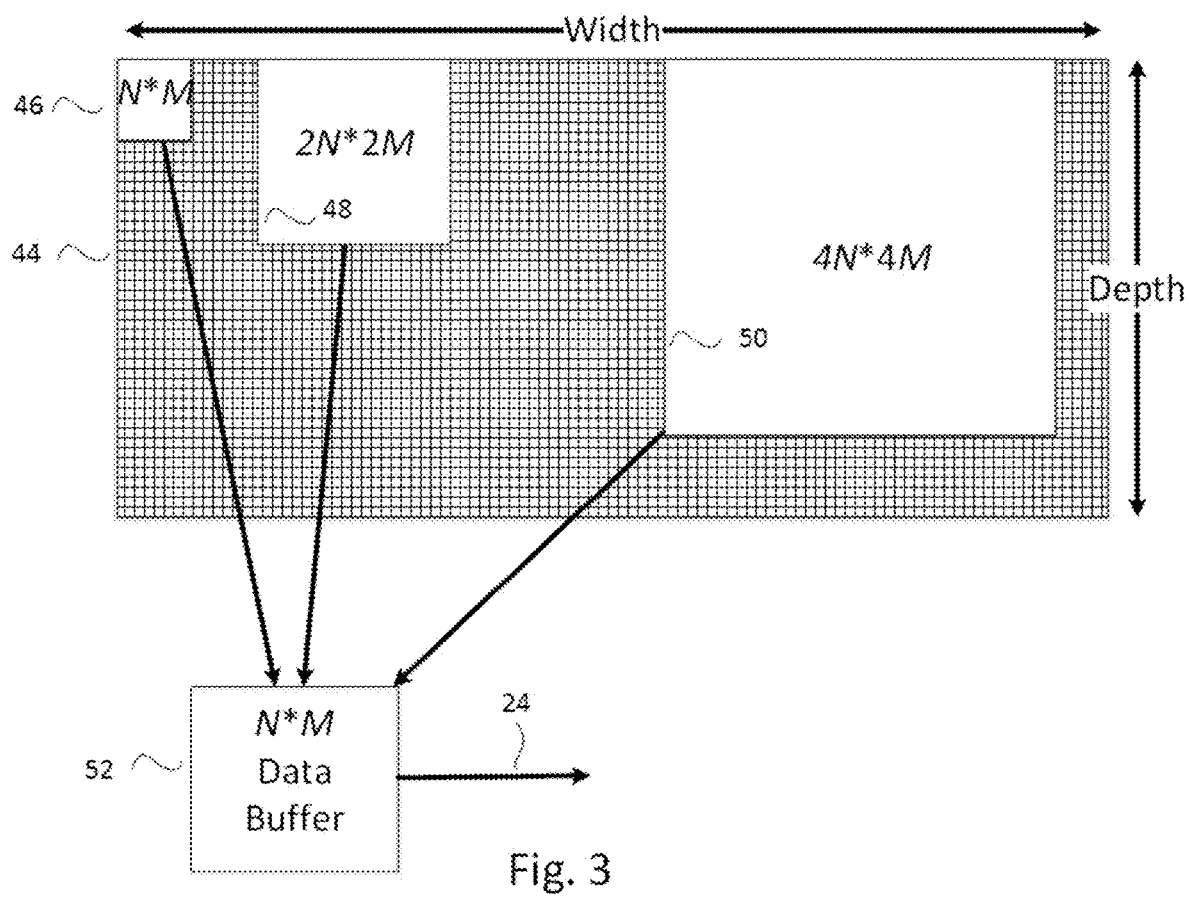
FIG. 3 is a diagram of example functionality of the data selection circuit 20 from FIG. 1 that facilitates the downscaling of images by factors of 1:1, 2:1, and 4:1.

FIG. 3, illustrates a functional depiction of data selection block 20 that may collect data from the input buffer block 12. The embodiment shown in FIG. 3 may consist of two main components, a memory array 44, capable of storing Width*Depth data units, such as color image pixel data, and data buffer 52, capable of storing N*M color image pixel data. Memory array 44 may be used for storing of one-dimensional and two-dimensional input data, depending of the type of data that may be processed.

Still referring to FIG. 3, the data selection block can be a set of N one-dimensional band contiguously spaced pass filter output magnitudes of radio frequency or audio data occurring at M time samples, creating a N*M spectral-time increment buffer 52.

FIG. 3 also illustrates an example of the method of sub-sampling sets of N*M pixels 46, 2N*2M buffers 48 and 4N*4M buffers 50 into a set of N*M data buffers 52. The outputs of the data buffer 52 may be connected through bus signal 24 to the neural network 26 of FIG. 1.

It is understood by someone skilled in the art that the sub-sampling of data buffers, for example, the sub-sampling of 2N*2M data buffer down to N*M data in the buffer, i.e., a 2:1 down-sampling process, can be performed through a choice of multiple algorithms, such as averaging the value of the 2N*2M data, or by selecting the minimum or maximum value of the 2N*2M of the buffer data.

Referring to FIG. 1, in one example it is by means of control bus signal 22 generated by the processor sub-system 16 that a specific set of pixels or spectral data buffer within the memory array 44 of FIG. 3 may be selected to be copied by data selection 20 of FIG. 1 to the N*M pixel buffer 52 of FIG. 3.

It is understood by someone skilled in the art that for imagery data that a color image pixel, such as a pixel encoded in RGB format, consists of more than one bit of information; in the case of so-called 888 RGB image data, the data of a single image pixel is encoded with eight bits of red, eight bits of green, and eight bits of blue image data. It is further understood for someone skilled in the art that the combination of those 24 bits may represent the color and the brightness of a single image pixel.

Figure 4:
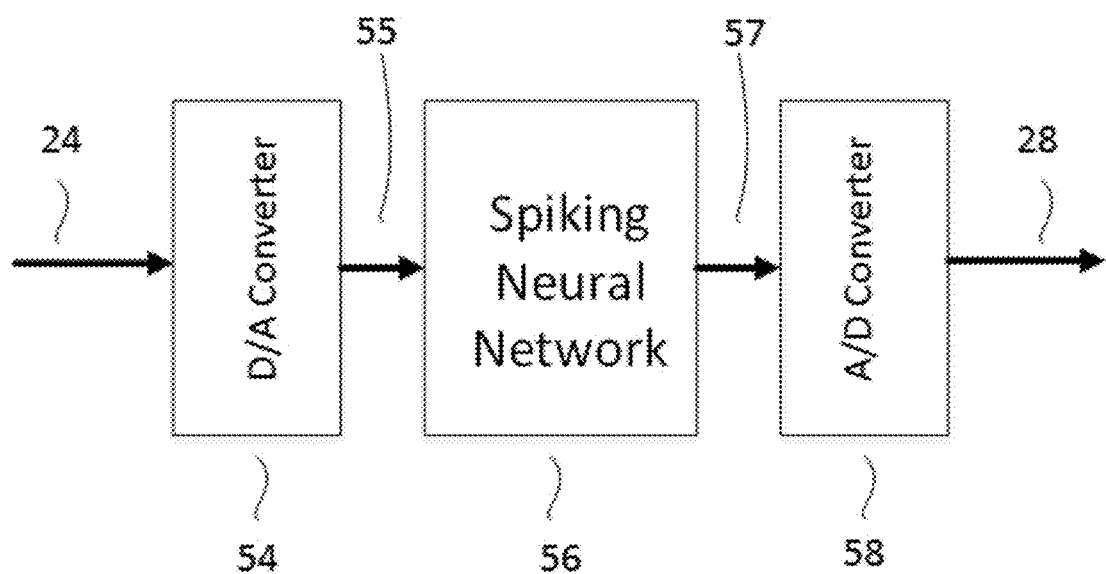
FIG. 4 is a circuit diagram of an example neural network 26 from FIG. 1.

Referring now to FIG. 4, an example of the neural network 26 of FIG. 1 may consist of a multi-bit digital-to-analog converter (DAC) 54, spiking neural network 56, and an analog-to-digital converter (ADC) 58. The input signal bus 24 may connect to the data selection block 20 of FIG. 1 and the output signal bus 28 may connect to the processor sub-system 16 of FIG. 1.

It is understood by someone skilled in the art that signals 55 and 57 may be bus systems carrying analog signals and that the bus widths of signals 55 and 57 may differ from each other.

Figure 5:
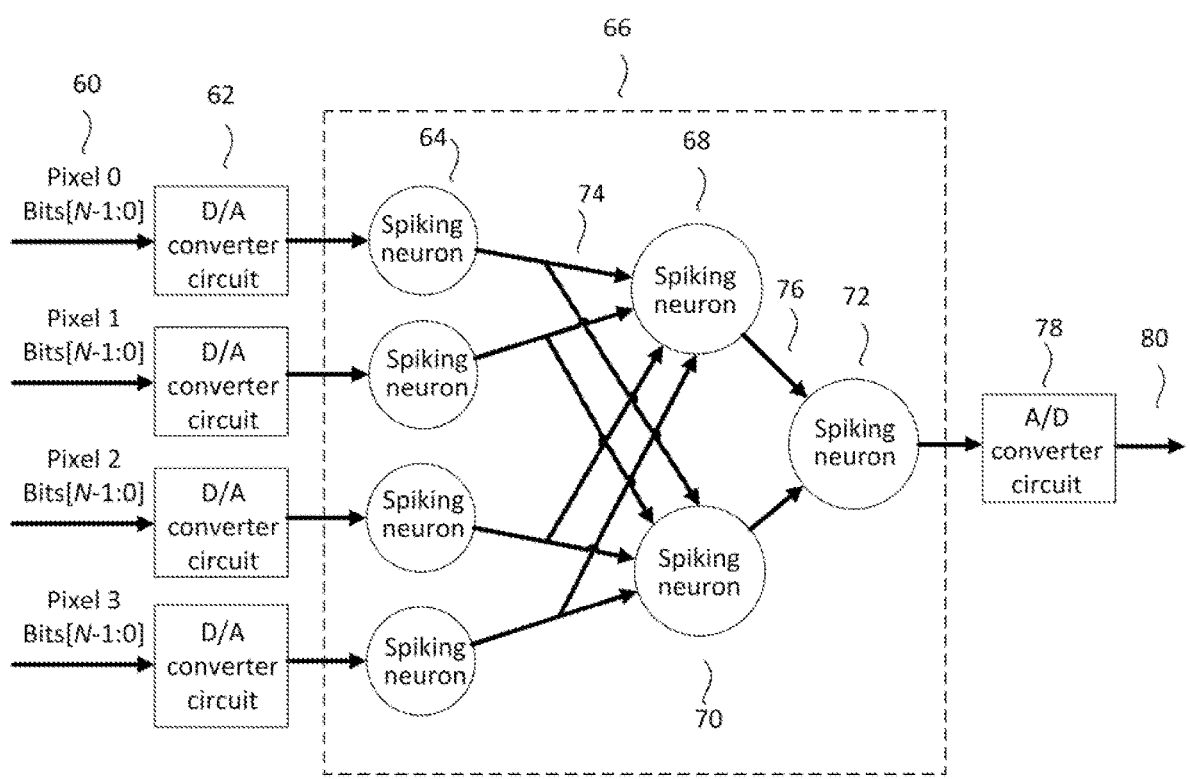
FIG. 5 is a detailed circuit diagram of one potential implementation of the artificial neural network 26 from FIG. 1 that is composed of four N-bit digital-to-analog converter (ADC) circuits, four spiking neurons with analog inputs as the first network layer, two fully connected spiking neurons as the intermediate network layer, one fully connected spiking neuron as the output layer of the network, and one analog-to-digital converter circuit (DAC) that converts the spiking signal into a digital output signal of one or more bits.

FIG. 5 illustrates a detailed circuit diagram of one potential implementation of the artificial neural network 26 from FIG. 1 that is composed of four N-bit digital-to-analog converter (ADC) circuits, four spiking neurons with analog inputs as the first network layer, two fully connected spiking neurons as the intermediate network layer, one fully connected spiking neuron as the output layer of the network, and one analog-to-digital converter circuit (DAC) that converts the spiking signal into a digital output signal of one or more bits. A multitude of input data, e.g., image pixels, each consisting of one or more bits, may connect to a multi-layer neural network 66. In the illustrated example, four spiking neuron circuits 64 are shown that may act as an input layer neuron of the network and may connect to one or more spiking neurons 68 and 70 of the intermediate network layer. It is known in the art that the connections 74 and 76 between the network layers may implement weighting functions, also referred to as weights, assigning unique weights for each connection between the outputs of spiking neurons 64 and neurons 68 and 70.

The outputs of neurons 68 and 70 may connect to an output layer neuron 72 of neural network 66 through the weighted connections 76. The output of spiking neuron 72 may connect to an analog-to-digital converter circuit 78 that provides a digital signal 80 of one or more bits at its output for consumption of connected digital logic.

It is known to those skilled in the art that any number of pixel inputs 60 of DACs 62 may be used. It is further known in the art that the neural network 66 may consist of any number of network layers and any number of connected neurons. It is also known in the art that neural networks with a higher number of network layers, a higher number of neurons and a higher number of connections between individual neuron may allow for a larger set of patterns to be stored, detected, and classified.

It is further known to those skilled in the art that connections 74 and 76 are referred to as synapses or synaptic connections between neurons.

Figure 6:
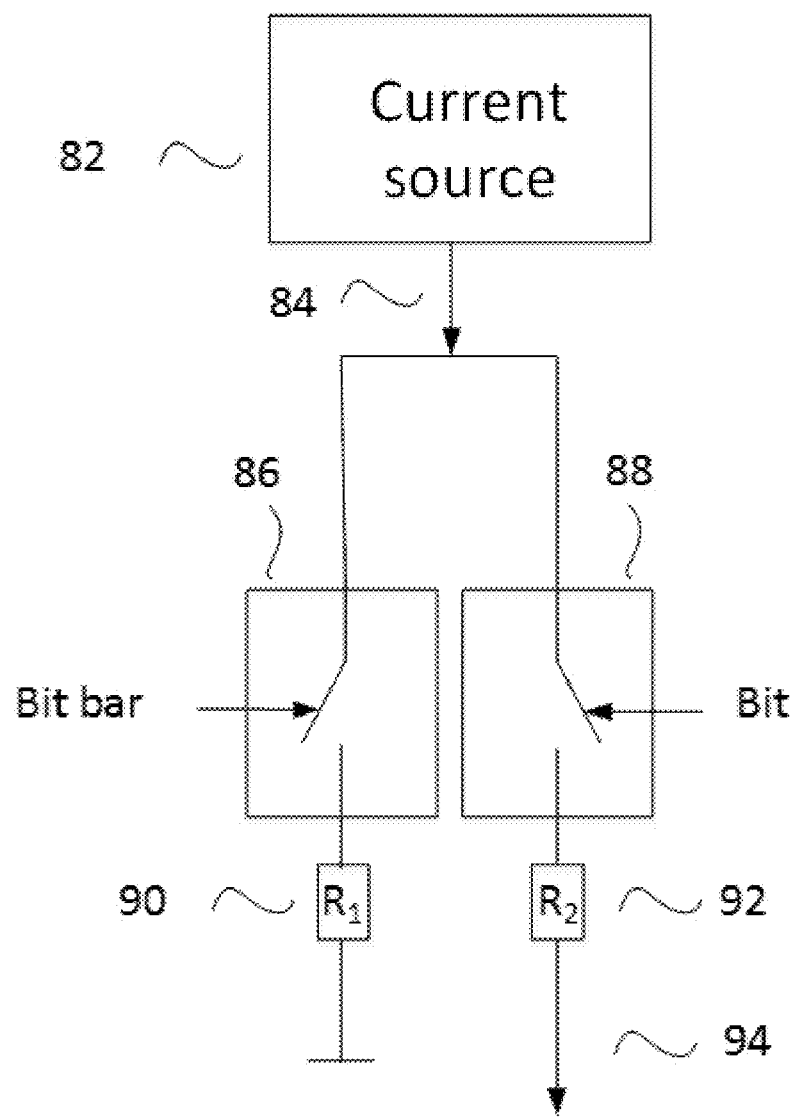
FIG. 6 is a diagram of an example one-bit slice of the digital-to-analog converter circuit 62 from FIG. 5.

Referring now to the circuit shown in FIG. 6, which is an example of a one-bit slice of a digital-to-analog converter (DAC), a current source 82 may provide a constant current on wire 84 to the two conducting paths through the switches 86 and 88, which may be controlled by a single input value "Bit" from 60 and its inverted value "Bit bar." If switch 86 is activated, the current from source 82 may flow through resistor 90 to the common ground connection of the circuit. If switch 88 is activated, the current from source 82 may flow through resistor 92 into node 94 instead. It is known to those skilled in the art that inverted signals, such as "Bit bar" may be generated from non-inverted signals, such as "Bit, with e.g., a circuit comprised of at least one PMOS transistor and at least one NMOS transistor.

Figure 7:
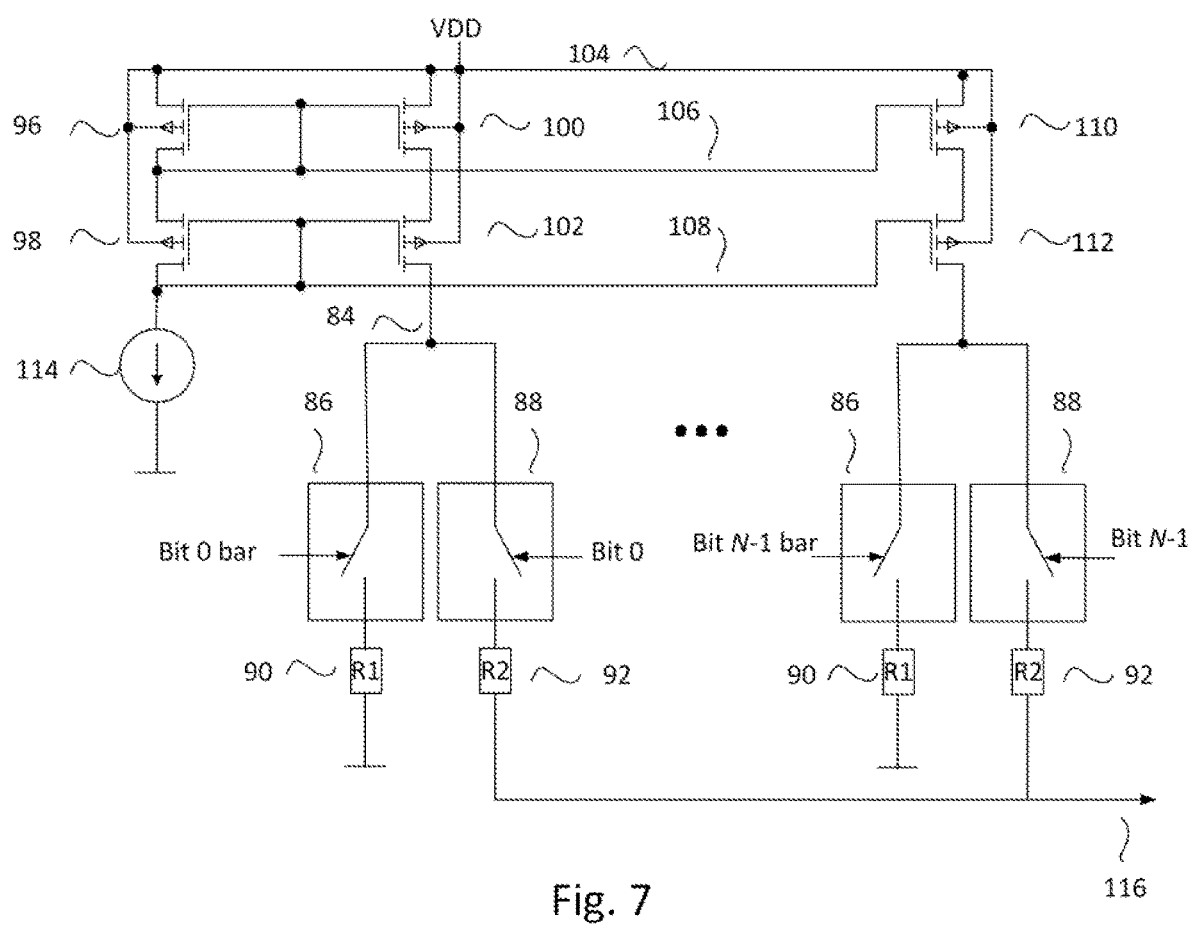
FIG. 7 is a diagram of a multitude of example one-bit digital-to-analog converter circuits that add up their output currents at the output node 116.

Referring now to FIG. 7, which represents a multitude of circuits as shown in FIG. 6 to implement an N-bit DAC with N being an integer number of 1 or higher. The outputs of switches 86 that may be controlled by inverted input signals may be connected over resistances 90 to the common ground node of the circuit. The outputs of switches 88, in FIG. 6 node 94 and shown here in FIG. 7, which may be controlled by the non-inverted input signals, such as "Bit 0" and Bit N−1," may be connected through net 116 and fed into the input 116 of the spiking neuron circuit in FIG. 9.

It is known to those skilled in the art that resistors 90 and 92 may alternatively be implemented as a multitude of transistors by biasing the transistor gates such that act as devices with constant resistance.

FIG. 7 also illustrates an example of a current mirror circuit that may be used as the common current source for bits 0, 1, through N−1, of the one-bit slices of the DAC circuitry. A very small constant current in the nano-ampere to micro-ampere range may be drawn from the current source 114 may flow through transistors 96 and 98. It is known to those skilled in the art that two major parameters of field effect transistors (FETs), such as FETs 96 and 98, may be the dimensions of the conducting channel. The dimensions may be defined by the width "W" of the channel and the length "L" of the channel. As is further known to those skilled in the art, the usual way of describing the channel dimensions may be by defining the ratio of the width to the length of the channel as "W/L." An increase in the width may reduce the channel resistance, while an increase in the length of the channel may increase the channel resistance.

As shown in FIG. 7, the pair of transistors 96 and 98 may build a current mirror with transistors 100 and 102. In an example implementation in 65 nm CMOS technology, the ratio of transistor width to length for node 96 and 98 may be W/L=1, e.g., W=60 nm and L=60 nm. It is known to those skilled in the art that that if the transistor width-to-length ratios of transistors 100 and 102 are chosen to be the same as those of transistors 96 and 98 (W/L=1), the resulting current through node 84 may be the same as the current through source 114.

FIG. 7 also illustrates that transistors 96 and 98 may also represent a current mirror with transistors 110 and 112. If, as an example, "N" is chosen to be 2, a 2-bit digital-to-analog converter may be implemented. In that case, the width-to-length ratio of transistors 110 and 112 may be chosen to be W/L=2, so that the current flowing through transistors 110 and 112, switch 88 of bit 1, and resistor 92 to node 116 is twice the amount of the current flowing through transistors 100, 102, switch 88 of bit 0 and resistor 92. It is known to those skilled in the art that this D/A circuitry may be extended to more than two input bits by adding bit slices with transistor ratios of W/L=2, W/L=4, and so on, until the desired number of digital input bits is achieved. As an example, using 8-bit digital input data, the width-to-length ratios of transistors 110 and 112 may be W/L=128. It is also known to those skilled in the art that any transistor with a width W that is p times larger than the smallest width used in the design, may be replaced by p transistors, each having a width W/p.

It is understood by someone skilled in the art that independent of the values that are applied to the N-bit inputs, the total current drawn from current source 114 may be constant.

Still referring to the invention of FIG. 7, the transistors 96, 98, 100, 102, 110, and 112 may be implemented as p-channel metal-oxide-semiconductor field-effect transistors (P-MOSFET or PMOS) transistors. The switches 86 and 88 may be implemented as p-channel (PMOS) or n-channel MOSFET (NMOS) or bipolar transistors. In a desired implementation, all transistors illustrated in FIG. 7 may be implemented as PMOS transistors. Also in the desired implementation, the resistive elements 90 and 92, may be implemented using NMOS transistors.

Still referring to FIG. 7, the constant current drawn from current source 114 may enable an accurate high-speed adjustment of the output current through node 116 and therefore accurate and high-speed analog signaling from the DAC to a spiking neuron circuit connected to node 116. The drawing of a constant amount of current through the entirety of all resistive elements 90 and 92 of FIG. 7, independent of the N-bit digital input data, may allow for a smooth and continuous current flow through node 116 when one or more of the N inputs change their values.

Figure 8:
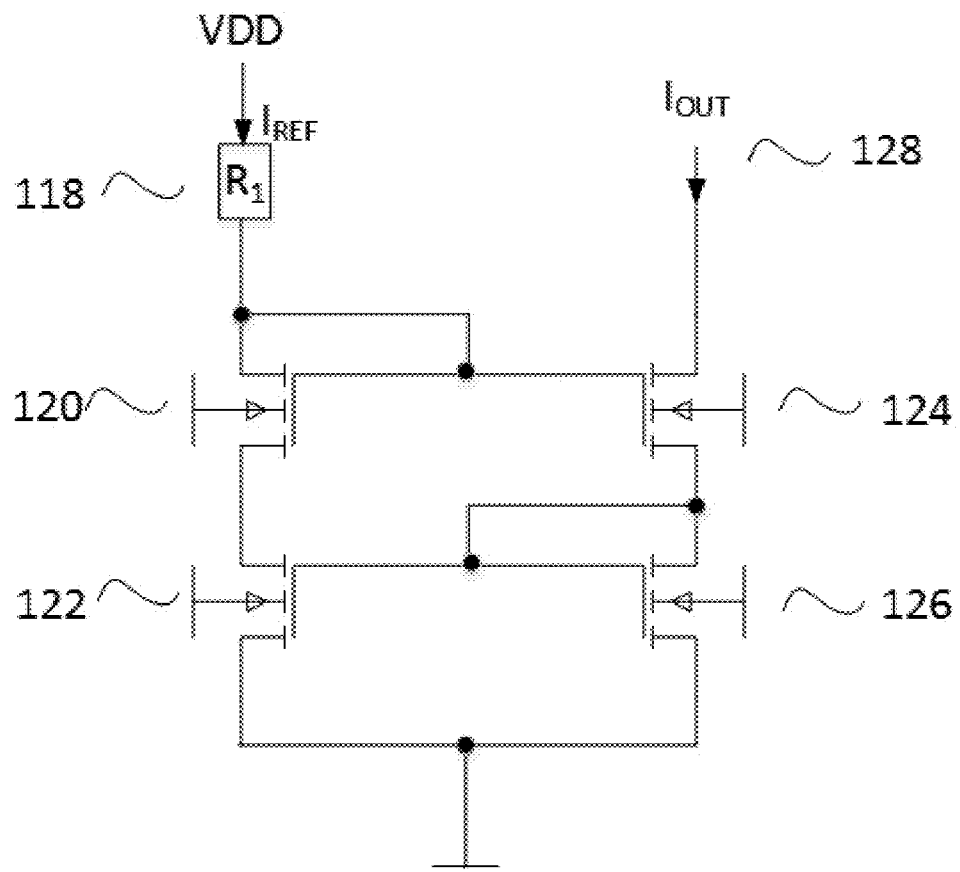
FIG. 8 is an example circuit implementation of the current source 114 of FIG. 7.

FIG. 8 illustrates an example circuit implementation of the current source 114 in FIG. 7. It is known to those skilled in the art that the combination of NMOS transistors 120, 122, 124, and 126 may implement a current mirror, such that the constant current through resistor 118 is "mirrored" in the output current on node 128. In one example implementation, where VDD may be set to 1.8V, resistor 118 may have a value of 270MΩ, and the W/L ratios of the transistors are set to 2/1 (e.g., W=240 nm and L=120 nm), the resulting constant current of the current source 114, when used as shown in FIG. 7, may be approximately 5 nA.

It is known to those skilled in the art that resistor 118 in FIG. 8 may be implemented using a PMOS transistor to reduce the area of the circuitry of FIG. 8 that may be needed for the realization of the current source as part of a chip layout.

Figure 9:
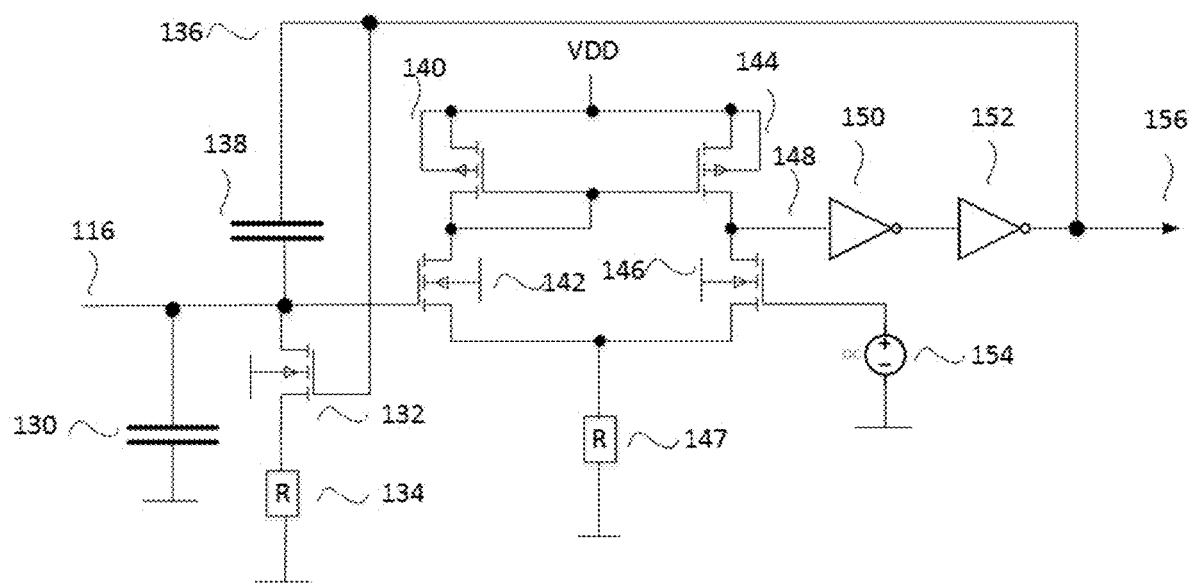
FIG. 9 is an example circuit implementation of the spiking neuron 68 from FIG. 5.

Referring now to FIG. 9, an example circuit description of a spiking neuron that may be used in the DAC 54, the spiking neural network 56, and the analog-to-digital converter (ADC) 58 of FIG. 4 is now provided. The neuron circuit may include an input node 116, a voltage source 154, a capacitor 130, connecting the input to ground, a capacitor 138, connecting the output node 156 to the input node 116, an NMOS transistor 132 and a resistor 134 that may discharge node 116 to ground, a comparator circuit consisting of PMOS transistors 140 and 142, NMOS transistors 144 and 146, and resistor 147, and two inverter circuits 150 and 152.

It is known to someone skilled in the art that the comparator circuit of FIG. 9, consisting of transistors 140, 142, 144, 146, and 147, may compare the gate voltage 116 of transistor 142 with the constant voltage 154 at the gate of transistor 146. If the gate voltage of transistor 142 is higher than the voltage of source 154, the voltage on node 148 may increase to the point where the output voltage of inverter 150 may decrease from around VDD to around zero Volts. The change of the output voltage of 150 may invert the output voltage of inverter 152 from around zero Volt to VDD, which may create the first half of the output waveform resembling a spike on output node 156.

It is also known to someone skilled in the art that an increase of the output voltage of 152 towards VDD may cause capacitor 138 to get charged, and that this may further accelerate the charging of capacitor 130 and may increase of the voltage on node 116 towards VDD. It is furthermore known to those skilled in the art that an increase of the voltage on node 136 may activate transistor 132 and may discharge the capacitor 116 through transistor 132 and resistor 134 towards ground, such that current flowing into input node 116 may start a new cycle of the operation of the spiking neuron circuit, i.e., charging of capacitor 130, threshold comparison in the comparator, and shaping of a spiking output waveform, may start over.

Still referring to FIG. 9, in one example implementation, the supply voltage VDD may be 1.8V, the output voltage of voltage source 154 may be 1.8V, the output voltage of voltage source 154 may be 0.65V, the resistors 134 and 147 may be 500 kΩ, the capacitance 130 may be 5 fF, the capacitance 138 may be 2 fF, the transistor width-to-length ratios of PMOS transistors 140 and 144 may be W/L=2, the W/L ratios of NMOS transistors 142 and 146 may be W/L=1, the W/L ratio of NMOS transistor 132 may be W/L=1, the width-to-length ratios of the transistors of inverter 150 may be $W_p/L_p=W_n/L_n=2$, the width-to-length ratios of the transistors of inverter 152 may be $W_p/L_p=1.5$ and $W_n/L_n=1$.

It is known to those skilled in the art that an inverter with width-to-length ratios of $W_p/L_p$ divided by $W_n/L_n$ of about 2.0 to 2.5, depending on the manufacturing technology used, may expose symmetric switching behavior, that is, the rising transition waveform on the output of the inverter may be the inverse of the falling transition waveform on the output. It is also known to those skilled in the art that, while symmetric switching behavior of the inverter circuit may be desired for digital logic, the inverters 150 and 152 in the circuit of FIG. 9 may be desired to create an asymmetric output waveform that more resembles a spike.

Figure 10:
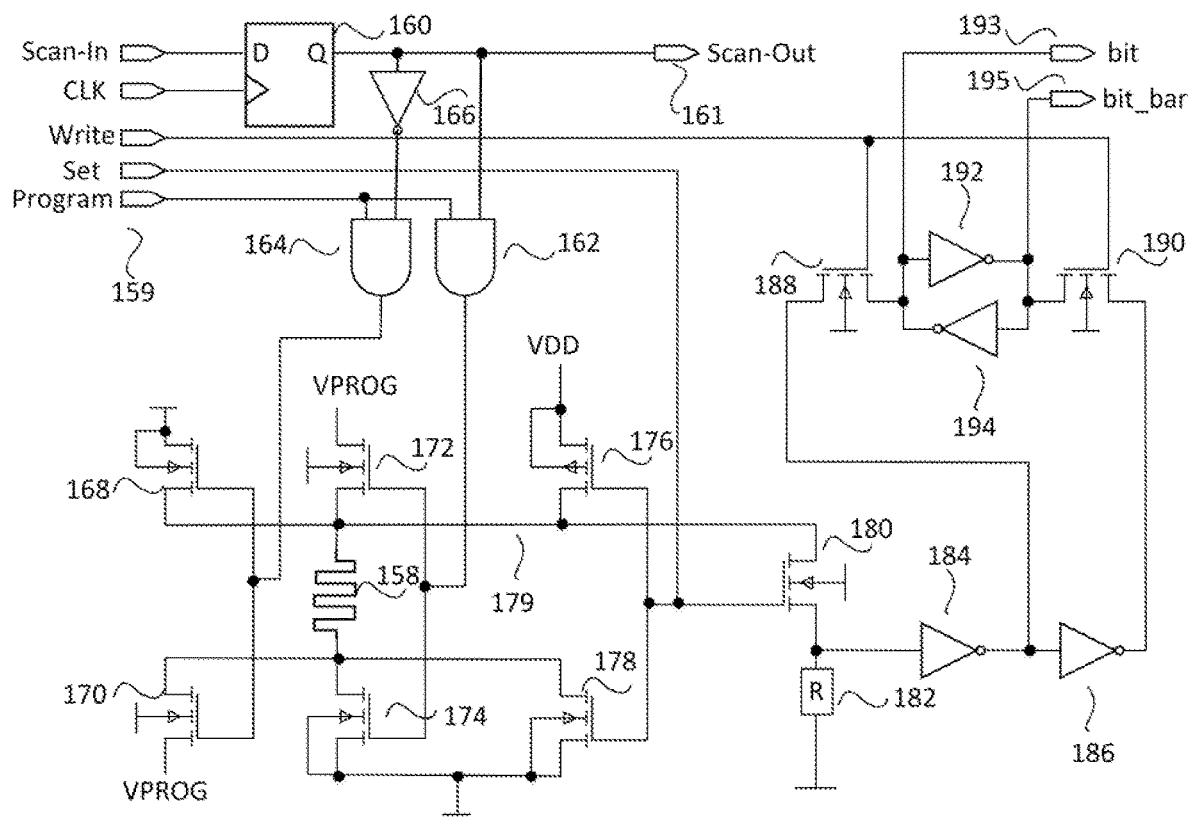
FIG. 10 is a circuit implementation of an example memristor programming and read-out circuit for storing of neural network weights.

FIG. 10 illustrates an example of a circuit for scanning a digital value into a scan chain, programming a memristor such that its resistance may represent the digital value scanned in, and programming a digital storage circuit to represent the value stored in the memristor. The circuit may consist of digital input signals 159 such as "Scan-In", "CLK", "Write", "Set" and "Program." and an output signal "Scan-Out" 161. "Scan-In" and "CLK" are used for scanning a value into flip flop 160, "Scan-Out" may connect to another instance of the circuit of FIG. 10, and "Program" may be used for programming a memristor 158, and "Set" and "Write" may be used for transferring the value stored in memristor 158 into a storage circuit, which may consist of pass transistors 188 and 190, and two inverter circuits 192 and 194. The outputs of the two inverters may be connected to output signals "bit" 193 and its inverse value, "bit_bar" 195. It is known to those skilled in the art that scan chains that may consists of multiple flip-flops where the input of the first flip-flop in the chain may be connected to a scan-in port at the system-level, the output of the last flip-flop in the chain may be connected to a scan-out port at the system level, and all other flip-flips are "chained" between the first and the last flip-flop. It is also known to those skilled in the art that the sequence scanned into the scan by means of clock signal "CLK" may be stored on the system or outside the system, e.g., in an external memory; furthermore, it known to those skilled in the art that the contents of the scan chain may be derived from manual calculations or functional simulations on a computer that is not part of the embodiments discussed herein. As an example, the neural network 66 of FIG. 5 may contain a multitude of synapses 74 and 76 of FIG. 11, each of which may be utilizing four instances of the circuitry of FIG. 10 and one instance of the circuitry of FIG. 12 for configuring a single synapse circuit. The "Scan-Out" ports 161 of each of the circuits of FIG. 10 may be connected to one "Scan-In" port of another instance of the circuit of FIG. 10. It is known to those skilled in the art that the order of connecting the scan ports of one instance of the circuit of FIG. 10 to another instance of the same circuit may be chosen arbitrarily. It is also known to those skilled in the art that the "Scan-In" port of the first circuit in the scan chain built as described herein and the "Scan-Out" port of the last element of the scan chain may be accessible at the top-level of circuit hierarchy, such that a predetermined scan vector may be scanned into the flip-flops 160 connected to the scan chain with the help of scan clock signal "CLK". It is further known to those skilled in the art that the length of the scan vector may be at least as many bits as there are flip-flops 160 connected to a scan chain.

Still referring to the invention of FIG. 10, the memristor 158 may be programmed by first scanning a data bit into flip-flop 160 and setting input "Program" to 1. If the output port Q of flip-flop 160 is logic 1, the output value of AND gate 162 may be 1, the gates of transistors 172 and 174 may be 1, and a current may flow downwards through memristor 158 from source voltage VPROG to ground and may change the memristor's 158 resistance from a low value to a high value or vice versa, depending on the memristor technology used. If the output port Q of flip-flop 160 is logic 0, the output value of AND gate 164 may be 1, the gates of transistors 168 and 170 be 1, and a current may flow upwards through memristor 158 from source voltage VPROG to ground and may change the memristor's 158 resistance from a high value to a low value or vice versa, depending on the memristor technology used.

It is known to those skilled in the art, that transistors 168, 170, 172, and 174 may be implemented as PMOS transistors instead of NMOS transistor and that the memristor programming voltage VPROG may be higher than the supply voltage VDD.

Still referring to FIG. 10, the logic value that is represented by a high resistance of memristor 158 may be interpreted by setting input "Set" to 1, thus, activating a conducting path through transistor 176, memristor 158, and transistor 178. The voltage of node 179 may be transmitted through transistor 180 and may be the input voltage of inverter circuit 184. The resistor 182 may draw the input voltage of inverter 184 towards ground when the "Set" input is 0. It is known to those skilled in the art that resistor 182 is necessary to avoid a floating voltage at the input of inverter 184 after the program, set, and write tasks of the circuit in FIG. 10 are completed.

It is also known to someone skilled in the art that a high-resistance state of memristor 158 may result in a voltage on node 179 that is closer to VDD than to ground, thus leading to a higher voltage at the input of inverter 184. It is further known to someone skilled in the art that a low-resistance state of memristor 158 may lead to a lower voltage at the input of inverter 184. It is also known to someone skilled in the art that the programming of the memristor 158 may conclude by setting input "Program" to 0.

In addition to, or alternatively, the output value of inverter 184 may be the inverted output value of inverter 186.

It is known to someone skilled in the art that transistors 188 and 190, together with inverters 192 and 194 of FIG. 10 may represent the circuit of a 1-bit static 6-transistor memory "6T SRAM" cell. It is also known to someone skilled in the art that the storage of one bit of data may be accomplished by other types of memory cells, such as a 4-transistor 2-resistor "4T2R" memory cell or a dynamic memory "DRAM" cell.

It is also known to someone skilled in the art that the SRAM cell of FIG. 10 may be programmed by setting the input "Write" to 1, which may force the inverters 192 and 194 to store the value of inverter 184 and the inverse value at the output of inverter 186. It is further known to someone skilled in the art that the inverters 192 and 194 are composed of lower drive strength transistors then the inverters 184, so that the output values of inverters 184 and 186 may force the logic values at the outputs of inverters 192 and 194.

Still referring to FIG. 10, the read-out operation of the memristor resistance and the write operation to the SRAM cell may conclude with changing the inputs "Set" and "Write" to 0. It is known to someone skilled in the art that the output values of inverters 192 and 194 will not change until either the circuit is turned off or a new write operation starts. The output signal "bit" may be connected to the output of inverter 194 and the output signal "bit_bar" may be connected to the output of inverter 192.

In one example implementation of FIG. 10, the W/L ratios of NMOS transistors 168, 170, 172, 174, 180, 188, and 190 may be W/L=2, PMOS transistor 176 may have a ratio of W/L=2, NMOS transistor 178 may have a ratio of W/L=1, resistor 182 may be 5 MEGΩ, and the drive strength of inverters 184 and 186 may be four times the drive strength of inverters 192 and 194 to allow for forcing the coupled inverters 192 and 194 of the SRAM circuit to be programmed.

Figure 11:
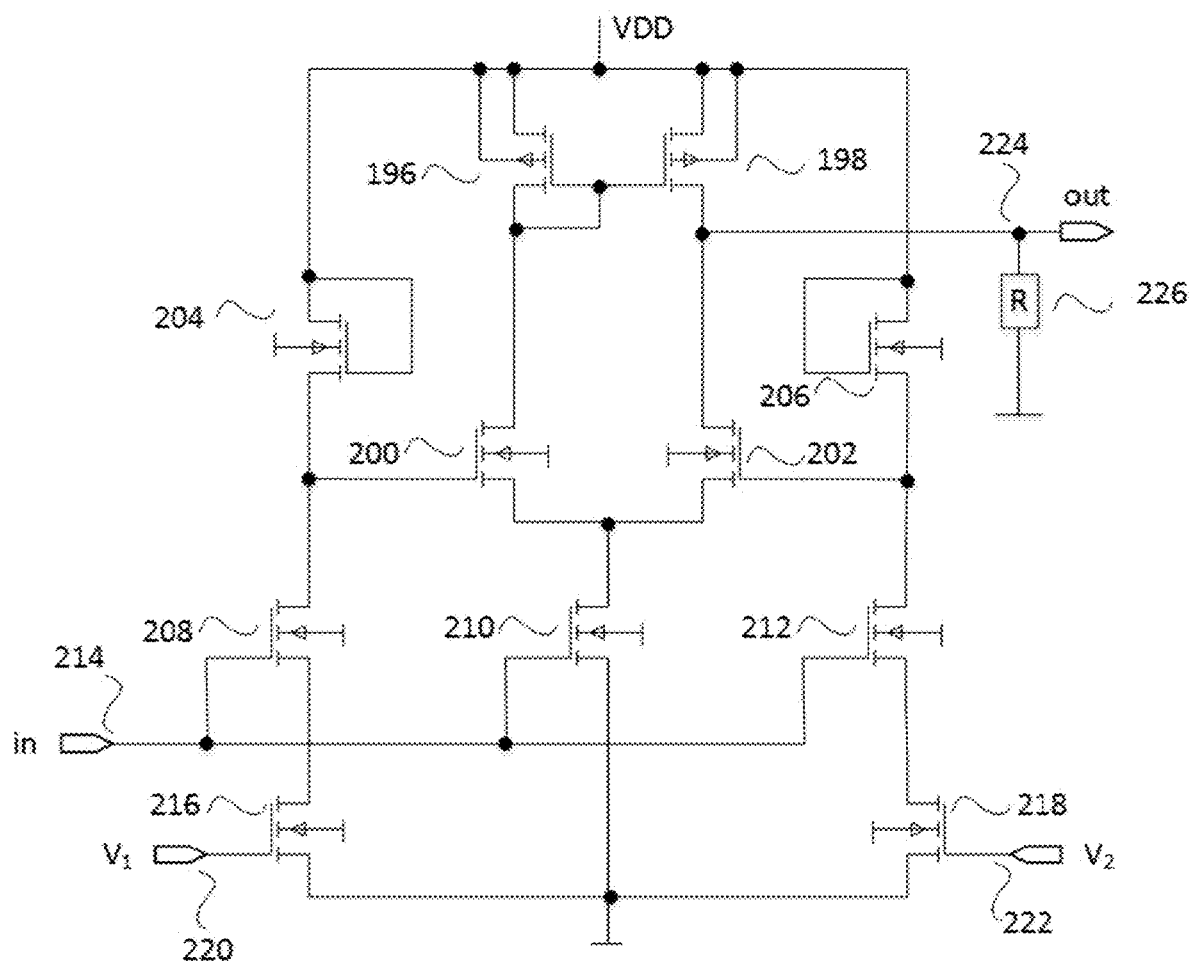
FIG. 11 is an example circuit implementation of a weight-programmable neural network synapse.

FIG. 11 illustrates a detailed circuit diagram of an example trans-conductance synapse with a programmable transfer function. The input voltage at node "in" may be converted to an output current through output node "out." The gain of the circuit may be controlled by applying positive voltages to either input node "V1" 220 or "V2" 222 and therefore the circuit may exhibit either excitatory or inhibitory behavior.

Still referring to FIG. 11, it is known to those skilled in the art that transistors 196 and 198 may represent a current mirror such that the current through 198 may be a defined multiple of the current flowing through 196, depending on the transistor ratios W/L of 196 and 198; transistors 204 and 206 may be operating in resistive mode, i.e., acting as resistors; transistors 200 and 202 may represent a differential pair whose tail current, i.e., the sum of the currents through 200 and 202 may flow through transistor 210.

It is further known to those skilled in the art that an input voltage "in" on node 214 of zero to a few millivolts may effectively turn off transistors 208, 210, and 212, so that the synapse circuitry may not consume any power for as long as the input voltage remains between zero and a few millivolts.

Still referring to FIG. 11, in one example implementation, the PMOS transistors 196 and 198 may have W/L ratios of W/L=4, the ratios of NMOS transistors 200 and 202 may be W/L=1, the ratios of NMOS transistors 200 and 202 may have ratios of W/L=2, the NMOS transistors 208 and 212 may have ratios of W/L=4, the NMOS transistors 210, 216 and 218 may have ratios of W/L=1/6. It is known to those skilled in the art that other width-to-length ratios and other transistor types may be used to implement a circuit with the characteristics of the trans-conductance synapse of FIG. 11.

Figure 12:
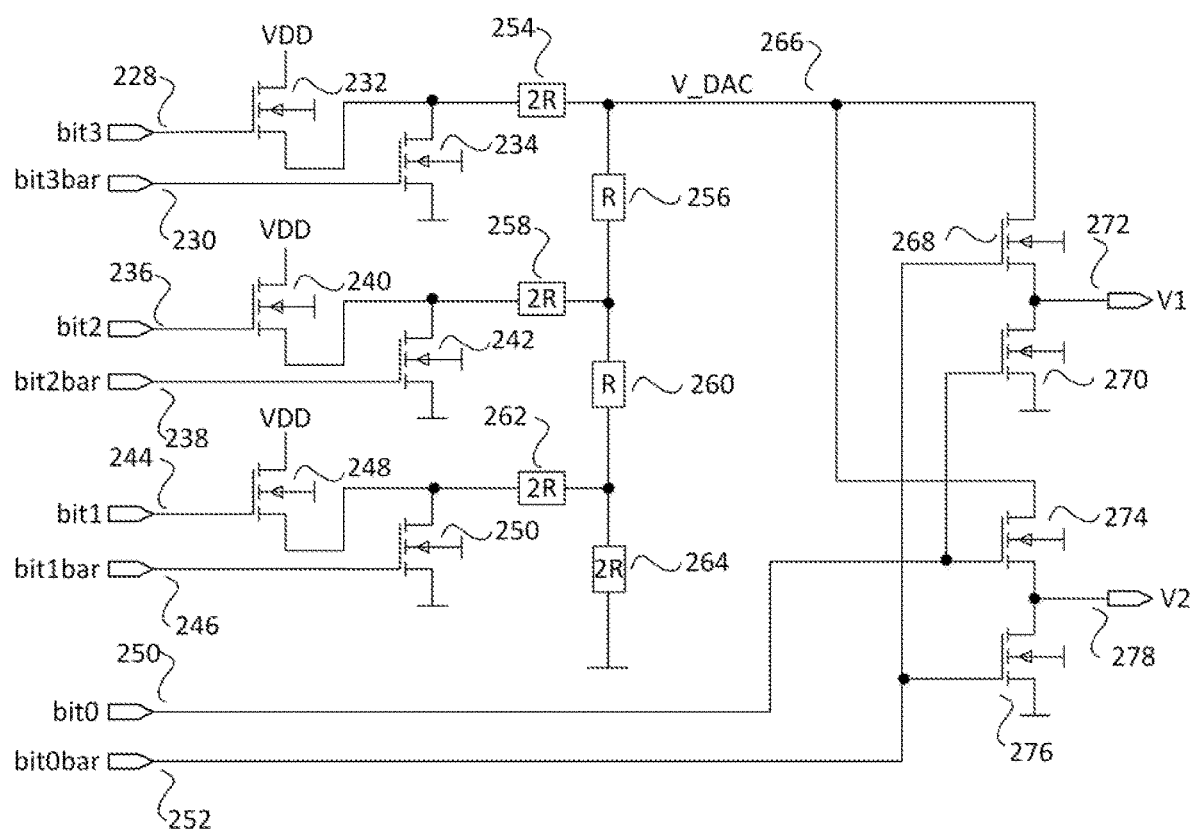
FIG. 12 is an example circuit implementation of a four-bit ladder-circuit-based digital-to-analog converter for use with the synapse of FIG. 11.

FIG. 12 illustrates a detailed circuit diagram of an example ladder-circuit-based 3-bit digital-to-analog converter (DAC) that uses a fourth input bit to connect the output signal of the DAC to one of the two outputs 272 and 278 while tying the other output to ground. It is known to those skilled in the art that the circuitry of FIG. 12 may be extended to implement digital-to-analog converters with a resolution of more than 3 bits.

Still referring to FIG. 12, each pair of inputs, e.g., "bit3" and "bit3bar" are connected to the outputs "bit" and "bit_bar" of one instance of the memristor-based configuration circuit of FIG. 10. It is known to those skilled in the art that one may identify the most significant bit of a multi-bit signal with the highest number, e.g., "bit3," and may identify the least significant bit with the lowest number, e.g., "bit1." One bit of a multi-bit signal, e.g., "bit0," may be used as a sign bit to select either excitatory or inhibitory behavior in a synapse that may be controlled by the circuit of FIG. 12.

Still referring to FIG. 12, the pairs of input signals may connect either node VDD or ground to one of the inputs of a "2R/R ladder DAC". It is known to those skilled in the art that the output of the DAC may be the node closest to the most significant bit 266 and that for each input to the DAC, one pair of resistors with the values R and 2*R, e.g., resistors 254 and 256, may be added to the ladder with the exception of the least significant bit of the digital input signal which may utilize resistor values of 2*R for both resistors 262 and 264.

Still referring to FIG. 12, the input "bit0" 250 may connect to the gates of transistors 270 and 274; a logic 1 on "bit0" may cause the voltage "VDAc" on node 266 to pass through transistor 274 to the output "V2" 278; a logic 0 on "bit0" may cause the voltage on node 266 to pass through transistor 268 to the output "V1" 272. It is known to those skilled in the art that the circuit of FIG. 12 may require each "bitXbar" input to have the opposite logic value of its respective "bitX" input; therefore, if "bit0" is 1, "bit0bar" may be 0 and transistor 270 may connect output 272 to ground; if "bit0" is 0, "bit0bar" may be 1 and transistor 276 may connect output 278 to ground.

In one example implementation, all transistors in the circuit of FIG. 12 may be implemented as NMOS transistors, the W/L ratios of transistors 232, 240, and 248 may be W/L=2, the W/L ratios of transistors 234, 242, 250, 270, and 276 may be 0.25, the W/L ratios of transistors 268 and 274 may be 1, resistances 254, 258, 262, and 264 may be 100 MEGΩ, and resistances 256 and 260 may be 50 MEGΩ. In is known to those skilled in the art that the transistors of FIG. 12 may alternatively be implemented with different W/L ratios, with PMOS transistors, or with PMOS and NMOS transistors. It is also known to those skilled in the art that resistors 254, 256, 258, 260, 262, and 264 may alternatively be implemented using NMOS or PMOS transistors while achieving a similar performance characteristic of the circuit in FIG. 12.

Figure 13:
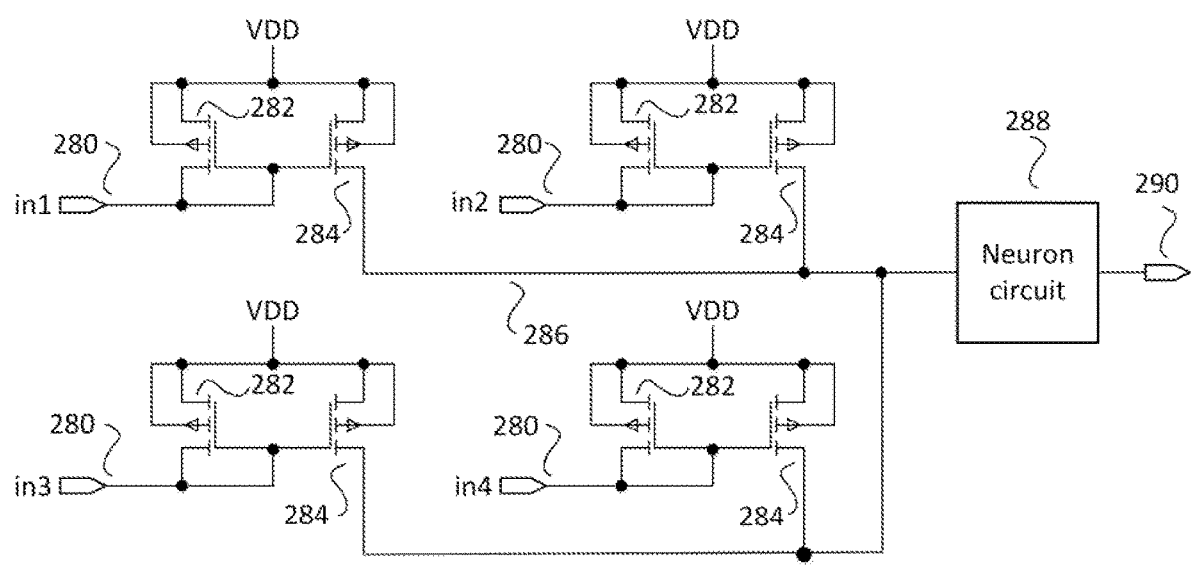
FIG. 13 is an example circuit implementation of a spiking neuron 68 from FIG. 5 with four input circuits that accumulate spikes from four synapses of FIG. 11.

FIG. 13 illustrates a circuit combining multiple input signals 280 at the input of a neuron circuit 288. It is known to those skilled in the art that each of circuits consisting of transistors 282 and 284 build a current mirror, such that the current flowing through each of the transistors 284 into net 286 may be a multiple of the current flowing through each of the nets 280 at the inputs; it is further known to those skilled in the art that the use of a current for each input of the circuit in FIG. 13 prevents parts or all of the accumulated current through net 286 to "push back" into the inputs 280 and subsequently impact of synapse circuits that may be connected to the inputs 280.

Still referring to FIG. 13, the accumulated current on net 286 may flow into the neuron circuit 288 and the outputs signal of the neuron may be connected to output 290.

It is known to those skilled in the art that neuron 288 of FIG. 13 may be implementing any spiking neuron circuit that may operate within the specifications of the remainder of the invention.

In one example implementation of the embodiment illustrated in FIG. 13, transistors 282 and 284 may be implemented as PMOS transistors, where the W/L ratio of transistors 282 may be W/L=1, and the ratio of transistors 284 may be 1.5; the neuron circuit 288 may be implemented as the neuron of FIG. 9.

Figure 14:
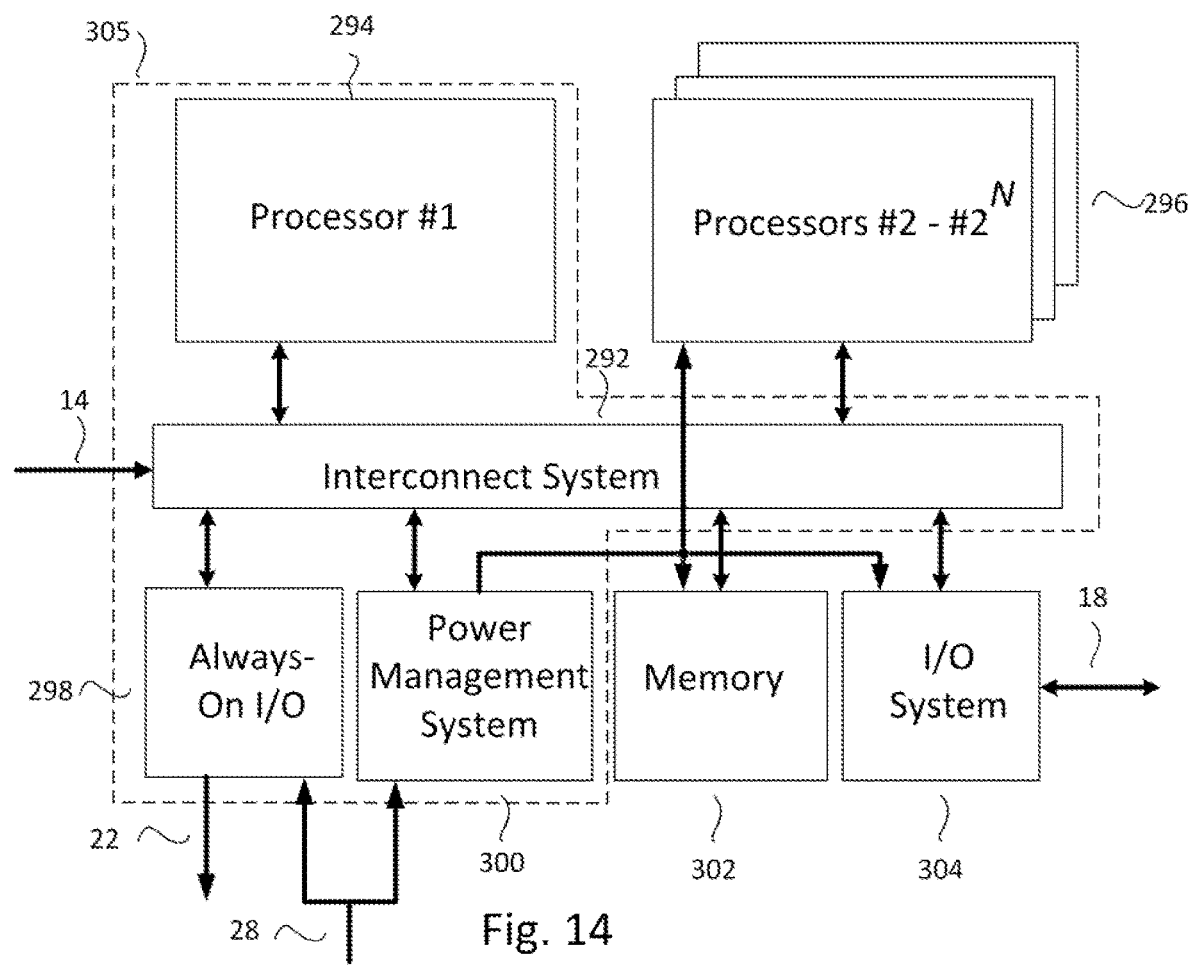
FIG. 14 is an example power-managed diagram of a power-managed implementation of the processor system from FIG. 2.

In another embodiment of the processor sub-system 16 of FIG. 1, now referring to the circuit diagram of FIG. 14, the processor sub-system may be implemented to reduce its power consumption. It is known to those skilled in the art that tasks that computer systems perform may require different computational performance at different times. It is also known to those skilled in the art that system power consumption may be reduced by idling certain components when the system determines less than 100 percent of the compute abilities are required to perform the task.

Still referring to FIG. 14, a power-managed version of the processor sub-system 16 in FIG. 1, may consist of an always-on interconnect system 292, an always-on processor 294, always-on input/output circuitry 298, always-on power management circuitry 298, as well as additional processors 296, a memory 302, and other input/output circuitry 304, wherein components 296, 302, and 304 may be power-managed, that is, those components may be set into a no power or lower power state when not needed for immediate computation and communication tasks. As used herein, a lower power state means consuming less power than is specified for the component when operating at its nominal operating state. As used herein, nominal operating state means operating at its specified clock frequency, being supplied its specified supply voltage and using its full processing capabilities (i.e., with nothing turned off or put into a sleep state). The lower power state may be accomplished by methods of reducing component clock frequencies, by reducing supply voltages to one or more of those components, and/or by turning off or setting into a sleep state some or all of the processing capabilities of those components. The power saved may be significant depending on the components and how these methods may be applied. It is known to those skilled in the art that memory 302 may be composed of one or more instances of SRAM, DRAM, Flash memory, or memristor-based memory.

Still referring to FIG. 14, a power-management system block 300 may receive control signals from the neural network block 26 through bus 28, and an always-on I/O system block 298 may receive control signals from a neural network block 26 through bus 28 and may send control signals to a data selection block 20 through bus 22.

The advantages of the disclosed embodiments and principles include, without limitation, the capability of processing audio, radio frequency and image input data streams, and the capability of detecting and classifying objects and/or signatures within these input data while the system may operate consuming only the lowest possible amount of power for performing data processing tasks; furthermore, the power savings may be achieved by temporarily deactivating one to all processors 296 of FIG. 14, while the power status of the processors 296 may be controlled by output signals of neural network block 26, or processor 294 through interconnect system 292.

Moreover, power savings may also be achieved by lowering the operating frequency of one to all processors 296 of FIG. 14 by a control implemented in power management system 300 or processor 294.

Still referring to the advantages of the disclosed embodiments and principles, using one example of a commercially available processor, a single ARM Cortex-M4 processor, manufactured in a 65 nm technology, may consume 40 µW/Mhz, so that it may consume about 10 mW when operating at a 250 Mhz clock frequency. It is known to those skilled in the art that powering down, e.g., three processors 284, identical to processor 282, may reduce the power consumption of the processors in FIG. 14 by 75%, e.g., from 4*10 mW to 10 mW.

In another embodiment, the neural network 26 of FIG. 1 may be implemented using digital logic. As a result, the digital-to-analog converter 54 and the analog-to-digital converter 58 may not be required for connecting the neural network 26 through buses 24 and 28 with the circuitry shown in FIG. 1. It is known to someone skilled in the art that this modification of the circuitry may have an impact on the power consumption of the neural network 26.

In yet another embodiment, the processor sub-system 16 of FIG. 1 may be implemented with a single processor core 30 of FIG. 2. It is known to those skilled in the art that using a single processor may lower the computation abilities of the processor sub-system shown in FIG. 2.

In yet another embodiment, multiple instances of neural network 26 may be used. It is known to those skilled in the art that multiple instances of neural network 26 may reduce the time required to process an image frame or another entity of data and may require alterations to data buffer 52 of data selection block 20, as well as changes in the logic of I/O system 40 or always-on I/O system 298.

As set forth above, one or more of the disclosed principles include:

Combining one or more analog neural network circuits with an array of one or more processors on a single chip;

Converting digital video, radio spectrum or audio data into analog signals and provide this stimulus to the analog neural network;

Providing the digital video, radio spectrum or audio data directly into the processor array for conditional processing when the processor array is active or gets activated by the output signals from the neural network;

Converting the one or more analog outputs of the neural network into digital signals and send these signals to the processor array;

Allowing one processor of the processor array to make decisions whether the data provided to the neural network should be processed by the processor array; and Putting one or more processors of the processor array into a lower power consumption state for as long as the neural network is not detecting any patterns of interest.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The claimed invention should therefore not be limited by the above described embodiment, method, and examples, but by all embodiments and methods within the scope and spirit of the claimed invention.

The invention claimed is:

1. A method of processing data comprising:
   storing digital data in a 2-dimensional memory;
   sub-sampling a selection of the stored digital data and providing the selection of the stored digital data to at least one neural network circuit;
   with the at least one neural network circuit, detecting at least one characteristic of the stored digital data with at least one portion of at least one processor circuit in a lower power or no power state, wherein the lower power state corresponds to a state in which less power is consumed by the least one portion of the at least one processor circuit than is specified for its nominal operating state; and
   in response to the detecting, powering the at least one processor circuit to perform processing on the stored digital data.

2. The method of claim 1, wherein the detecting includes 2-dimensional pattern matching.

3. The method of claim 2, further comprising programming weights in the at least one neural network circuit to determine a set of patterns to be detected.

4. The method of claim 2, wherein the detecting includes classifying at least the selection of the stored digital data into a number of images and/or pattern classes.

5. The method of claim 1, wherein the processing includes image detection and image classification.

6. The method of claim 1, wherein the processing includes spectral analysis to identify emitters.

7. The method of claim 1, wherein the processing includes convolution processing.

8. The method of claim 1, wherein the processing includes identifying speaking or spoken phenomes.

9. The method of claim 1, wherein the processing includes identifying acoustic signatures of physical phenomena.

10. The method of claim 1, further comprising converting at least the selection of the stored digital data into analog signals and applying the analog signals to the at least one neural network circuit.

11. The method of claim 1, further comprising converting analog output of the at least one neural network circuit to digital signals and applying the digital signals to the at least one processor circuit.

12. The method of claim 1, wherein the detecting includes evaluating at least the selection of the stored digital data to find at least one object or at least one signature, or both, of interest.

13. The method of claim 1, wherein the processing includes detecting and classifying at least one object or at least one signature, or both, of interest.

14. The method of claim 1, wherein the sub-sampling comprises setting a 1:1, 2:1, or 4:1 sampling factor.

15. The method of claim 1, further comprising programming a functionality of the at least one neural network circuit using programmable storage elements.

16. The method of claim 15, further comprising calculating a set of weights on external compute equipment and programming the set of weights into the programmable storage elements.

17. A data processing system, comprising:
    a data selection block comprising:
      at least one 2-dimensional memory configured to store digital data, and
      a sub-sampling circuit configured to read from multiple memory addresses and sub-sample a selection of the stored digital data from the multiple memory addresses;
    at least one neural network circuit constructed and arranged to receive the selection of the stored digital data and detect at least one characteristic of the stored digital data; and
    at least one processor circuit constructed and adapted into a lower power or no power state until the at least one neural network circuit detects the at least one characteristic and then adapted into a powered state to perform processing on the stored digital data, wherein the lower power state corresponds to a state in which less power is consumed by the at least one processor circuit than is specified for its nominal operating state.

18. The system of claim 17, wherein the at least one neural network circuit and the at least one processor circuit are on a single chip.

19. The system of claim 17, further comprising a buffer circuit constructed and arranged to receive at least the selection of the stored digital data and output at least the selection of the stored digital data to the at least one neural network circuit and the at least one processor circuit.

20. The system of claim 17, wherein the sub-sampling circuit is configured to sub-sample the selection of the stored digital data by combining read values through averaging, selecting minimum read values, or selecting maximum read values.

21. The system of claim 20, wherein the at least one processor controls the data selection circuit.

22. The system of claim 17, further comprising a digital-to-analog circuit constructed and arranged to convert at least the selection of the stored digital data to analog data and apply the analog data to the at least one neural network circuit.

23. The system of claim 17, further comprising an analog-to-digital circuit constructed and adapted to convert an analog output of the at least one numerical control circuit to a digital signal and apply the digital signal to the at least one processor circuit.

* * * * *